United States Patent [19]
Müller

[11] Patent Number: 5,520,213
[45] Date of Patent: May 28, 1996

[54] VALVE ASSEMBLY

[75] Inventor: Fritz Müller, Ingelfingen, Germany

[73] Assignee: Gebrüder Müller Apparatebau GmbH & Co. KG, Ingelfingen, Germany

[21] Appl. No.: 453,444

[22] Filed: May 30, 1995

Related U.S. Application Data

[63] Continuation of Ser. No. 118,935, Sep. 9, 1993, abandoned.

[30] Foreign Application Priority Data

Sep. 18, 1992 [DE] Germany .................... 42 31 343.0

[51] Int. Cl.⁶ ............................................. F16K 27/00
[52] U.S. Cl. .............................. 137/375; 251/366
[58] Field of Search .......................... 137/375; 251/15, 251/358, 367, 368, 366

[56] References Cited

U.S. PATENT DOCUMENTS

| | | | |
|---|---|---|---|
| 3,334,650 | 8/1967 | Lowrey et al. | 137/375 |
| 4,288,896 | 9/1981 | West et al. | 29/157.1 R |
| 4,535,803 | 8/1985 | Price | 137/375 |
| 4,592,534 | 6/1985 | Ueda et al. | 251/368 X |
| 4,696,323 | 9/1987 | Iff | 137/375 |
| 5,139,043 | 8/1992 | Hyde et al. | 137/375 X |

*Primary Examiner*—Kevin Lee
*Attorney, Agent, or Firm*—Henry M. Feiereisen

[57] ABSTRACT

A plastic body, in particular a valve for use with aggressive fluids, includes a valve box having an inner body made of especially chemically highly resistant plastic material and provided with passageways for flow of fluid, and an outer body made of especially mechanically high-strength plastic material and supporting the inner body. The outer body is shaped to form simultaneously the valve casing which is provided with a suitable thread for attachment of a bonnet and conduits.

5 Claims, 1 Drawing Sheet

VALVE ASSEMBLY

This is a continuation of application Ser. No. 08/118,935, filed Sep. 9, 1993, now abandoned.

BACKGROUND OF THE INVENTION

The present invention refers to a plastic body, in particular to a valve of plastic material, especially for use with aggressive fluids.

There is an increasing demand by industries, especially the electronic industry in the area of microelectronics and chip manufacturing to work with fittings, mountings and valves which are free of metal or at least include a minimum of metal because the use of metal parts may adversely affect the purity of electronic chips.

SUMMARY OF THE INVENTION

It is thus an object of the present invention to provide a plastic body or fitting, especially a valve which is essentially devoid of any metallic parts.

This object, and others which will become apparent hereinafter, is attained in accordance with the present invention by providing a valve box with an inner body made of highly resistant plastic material and provided with passageways for flow of fluid and an outer body made of high strength plastic material and supporting the inner body.

Preferably, the inner body is made of plastic material on the basis of perfluoroalkoxy or on the basis of talc-reinforced polypropylene, and the outer body is made of plastic material on the basis of polyvinylidenefluoride. Suitably, the outer body is molded or sprayed onto the inner body.

In accordance with a preferred embodiment of the present invention, the outer body is extended in direction of the center axis of the plastic body or valve to form also the valve casing in which the drive elements for opening and closing of the valve are fitted. In this manner, compared to two-part designs of conventional valves with upper casing part and lower casing part, the valve casing according to the present invention can be configured in one piece so that the use of generally metallic screws to join together the upper casing part and the lower casing part of the valve casing becomes moot. Thus, the valve is essentially free of any metal components as required in particular by microelectronics industries.

The outer body of high strength plastics may be provided with suitable threads for attachment of respective conduits. It is however also possible to directly provide the axial ends of the inner body with a thread of high-strength plastic material on the basis of polyvinylidenefluoride.

A plastic body according to the invention can be made by initially forming the inner body through injection molding in a suitable mold. After allowing to cool down, the inner body is placed in another mold for molding or spraying the outer body of high-strength plastic material onto the inner body which is made of highly resistant plastic material.

The inner body is thus characterized by a desired resistance towards the fluid, e.g. chemically aggressive or corrosive fluids, while the outer body has the necessary strength to support the inner body and to receive the drive elements of the valve and to allow the provision of threads.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
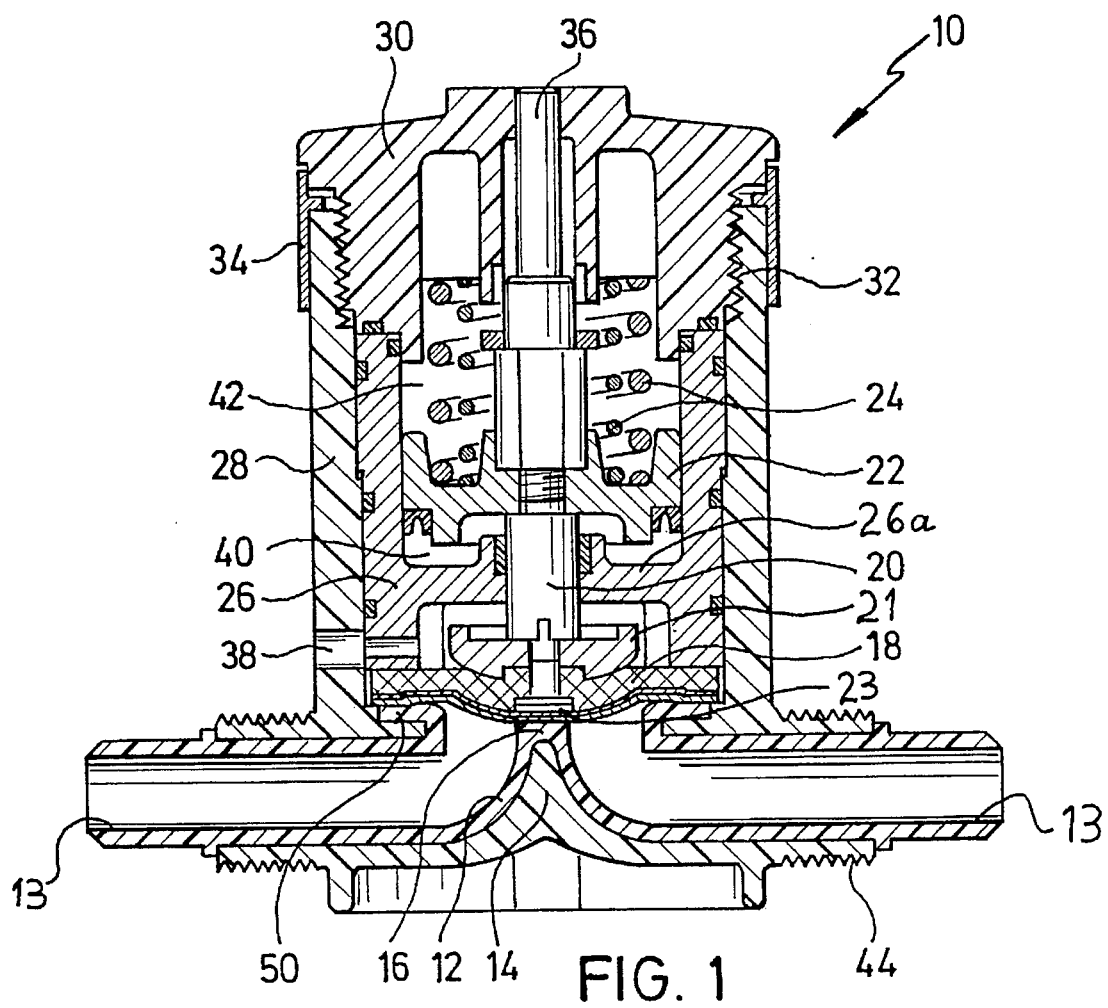
FIG. 1 is a sectional view of one embodiment of a valve, illustrating in detail a valve box comprised of an inner body of a highly resistant material and an outer body of a high-strength material.

Referring now to the drawing and in particular to FIG. 1, there is shown an exemplified sectional view of one embodiment of a weir-type diaphragm valve, generally designated by reference numeral 10. The valve 10 includes a valve box having an inner body or weir 12 which forms a valve seat 16 and is provided with connecting conduits 13 for an inlet and an outlet.

The inner body 12 is made of a high-purity and highly resistant material on the basis of perfluoroalkoxy (PFA) and is received and supported by an outer body 14 which at least partly encloses the inner body 12. The outer body 14 is made of high-strength material on the basis of polyvinylidenefluoride (PVDF).

Cooperating with the valve seat 16 is a diaphragm 18 which is acted upon by a valve stem 20 extending vertically and centrally within a cylindrical valve casing 28. The upper end of the valve casing 28 is closed by a bonnet 30 which has an external thread engageable with a complementary internal thread of the casing 28. A cover sleeve 34 masks the transition between the casing 28 and the bonnet 30.

Arranged at the diaphragm-proximal end of the valve stem 20 is a disk 21 which is in form-locking engagement with the diaphragm 18 and receives a plug 23 which is partly embedded within the diaphragm 18 and connected to the stem 20. Mounted to the stem 20 is a plunger 22 which is acted upon by springs 24 and urged in closing direction of the valve, as shown in FIG. 1. The plunger 22 is movably guided in axial direction of the valve within a liner or cage 26 which is securely held within the valve casing 28 between the bonnet 30 and the diaphragm 18. By means of the bonnet 30, the cage 26 is pressed against the diaphragm 18 so that the diaphragm 18 is securely fixed between the cage 26 and an annular flange 50 which is formed at the inner body 12.

As shown in FIG. 1, the cage 26 is of generally H-shaped configuration to define a crosspiece 26a which extends between the plunger 22 and the diaphragm 18. A chamber 40 is thus formed between the underside of the crosspiece 26a of the cage 26 and the diaphragm 18. A further chamber 42 is formed within the valve casing 28 between the plunger 22 and the bonnet 30.

A number of O-rings or gaskets are further provided to prevent leakage of fluid.

As clearly shown in FIG. 1, the casing 28 constitutes an integral part of the outer body 14 and is formed by generally cylindrically extending the outer body 14 upwardly away from the inner body 12 in axial direction of the valve. By forming a one-piece construction of outer body 14 and casing 28, the need for screw fasteners is eliminated in order to accomplish an essentially metal-free configuration of the valve.

As further shown in FIG. 1, the valve stem 20 is connected at the diaphragm-distal end to a cylindrical plug which is threadably engaged onto the stem 20 and forms a position indicator 36 so that the position of the valve can be recognized from the outside. In vicinity of the diaphragm 18, the cage 26 and the casing 28 are provided with aligned channels to form a vent bore 38 by which the chamber 40 is ventilated.

As set forth above, the valve is closed by the action of the springs 24 which urge the plunger 22 and thus the stem 20 downwards to force the diaphragm 18 to rest on the seat 16 and to close the valve. By introducing pressure fluid e.g. compressed air into the compartment 40 below the plunger 22 the valve is opened so as to retract the plunger 22 against the force of the springs 24 and to withdraw the diaphragm 18 from the valve seat 16.

It will be appreciated by persons skilled in the art that the closing of the valve by the diaphragm 18 may also be attained without the provision of the springs 24 by introducing pressure fluid, e.g. compressed air, into the chamber 42 above the plunger 22. Opening of the valve is attained in a manner described above i.e. by introducting pressure fluid into the chamber 40 below the plunger 22.

Persons skilled in the art will also understand that the valve must contain connections for supply and withdrawal of pressure fluid; however, these connections are not shown in the drawing for sake of simplicity.

By substituting the springs 24 and controlling a movement of the plunger 22 through suitably circulating a pressure fluid, the valve can be designed completely free of metal since all parts of the valve are made of plastic material.

Since the outer body 14 and the valve casing 28 are made of a high-strength plastic material, the outer body 14 can be formed with the thread 32 for attachment of the bonnet 30 as well as with further threads 44 for attachment of suitable conduits.

Figure 2:
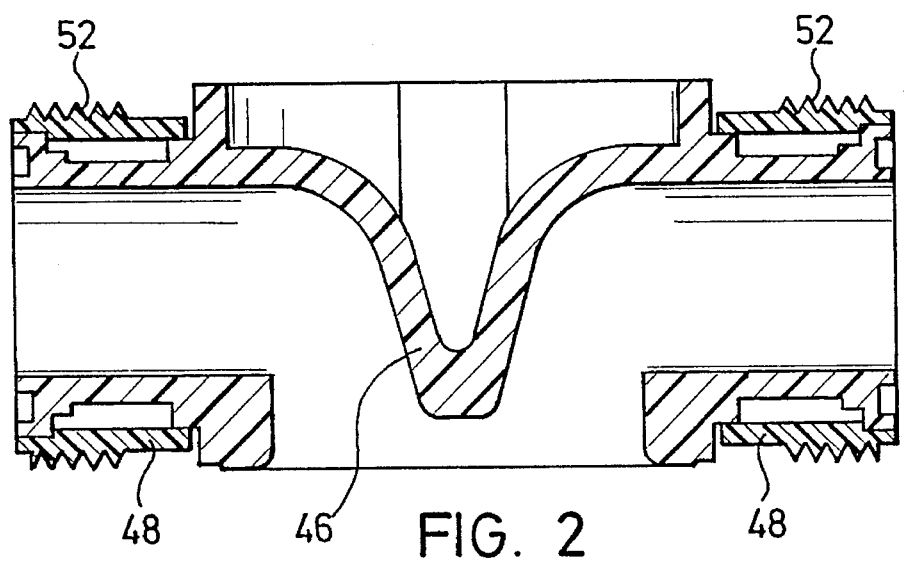
FIG. 2 is a sectional view of a fitting of highly resistant material, with the fitting being formed with a thread of high-strength material.

Turning now to FIG. 2, there is shown a sectional view of a fitting 46 made of highly resistant plastic material on the basis of perfluoroalkoxy or talc-reinforced polypropylene. This fitting 46 may represent an inner body 12 of the valve, however, it may also constitute a conduit, a branch or some other mounting.

As illustrated in FIG. 2, the opposing axial ends of the fitting 46 are each enclosed by a collar 48 with external thread 52 for attachment of e.g. conduits. The collars 48 are made of high-strength plastic material on the basis of PVDF or on the basis of glass fiber reinforced polypropylene.

When making the plastic body according to the invention, the inner body 12 is initially formed through injection molding in a suitable mold, and after allowing to cool down is placed in another mold for molding the outer body 14 with casing 28 or collars 48 onto the inner body 12.

While the invention has been illustrated and described as embodied in a plastic body, it is not intended to be limited to the details shown since various modifications and structural changes may be made without departing in any way from the spirit of the present invention.

What is claimed as new and desired to be protected by Letters Patent is set forth in the appended claims:

1. A valve assembly of a type allowing use with aggressive fluids, comprising: an inner body made of chemically highly resistant plastic material and provided with passageways for flow of fluid; and an outer body made of mechanically high strength plastic material and having a lower end, said inner body being secured to said lower end of said outer body, said outer body having a portion extending vertically upon said lower end and away from said inner body, said portion being dimensioned to form a valve casing for enclosing a valve member.

2. A plastic body as defined in claim 1 wherein said inner body is made of plastic material selected from the group consisting of perfluoroalkoxy and talc-reinforced polypropylene and said outer body is made of plastic material selected from the group consisting of polyvinylidenefluoride and glass fiber reinforced polypropylene.

3. A plastic body as defined in claim 1 wherein said outer body is molded onto said inner body.

4. A plastic body as defined in claim 1 wherein said outer body includes a thread and said valve casing which is connected in one piece with said outer body is provided with a thread.

5. A plastic body as defined in claim 1 wherein said outer body includes a collar with an external thread molded onto said inner body and made of high-strength plastic material on the basis of polyvinylidenefluoride or on the basis of glass fiber reinforced plastics.

\* \* \* \* \*